Sept. 15, 1953   C. A. P. JOHNSON   2,652,171
COVER SECURING MEANS FOR WALL BOXES
Filed Aug. 30, 1950

INVENTOR.
Carl A.P. Johnson
BY Ezekiel Wolf
his Attorney.

Patented Sept. 15, 1953

2,652,171

UNITED STATES PATENT OFFICE 2,652,171

COVER SECURING MEANS FOR WALL BOXES

Carl A. P. Johnson, North Quincy, Mass., assignor to S. H. Couch Company, Inc., North Quincy, Mass., a corporation of Massachusetts Application August 30, 1950, Serial No. 182,219

5 Claims. (Cl. 220—55)

The present invention relates to an improvement in construction of outlet boxes, wall boxes or other similar structures wherein a cover plate is to be attached to a box which is usually secured in a fixed position and cannot be turned or manipulated freely thereby restricting the facility of attaching the cover.

While the invention is applicable primarily to telephone wall boxes and outlet boxes, it may be applied to other constructional uses where the principles in structure involving the present invention may be applicable.

Particularly in electrical construction, a face plate must often be attached to a wall or outlet box after the box has been mounted in place. The common practice in such arrangements is to thread a tab or flange projecting from the box at its rim and the face plate is provided with holes through which screws may be inserted to screw into the tabs projecting from the rim or edge of the box. Due to irregularities in mounting the box and any lack of accurate tolerance in wall space and because of other difficulties, the mechanic often encounters considerable difficulty in fixing the cover plate over the box.

The present invention provides a very simple and inexpensive means of construction whereby the cover can be readily attached to the box in a very simple fashion. Furthermore the cover will be held securely in place and will be attached by more than merely the thickness of the sheet material of which the outlet box may be made.

The merits and advantages of the present invention will be more fully understood from a description of the construction in which the invention is embodied and illustrated by the drawings annexed to the specification, in which.

Figure 1:
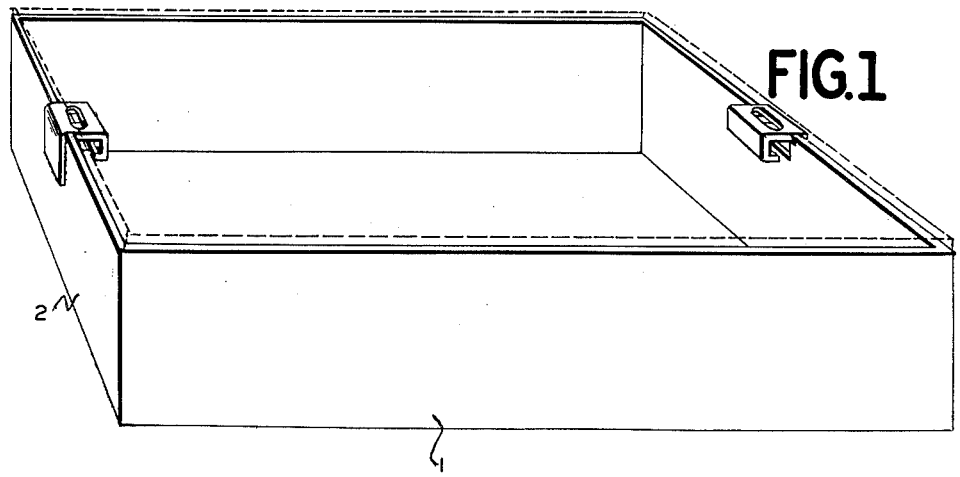
Figure 1 shows a perspective view of the outlet box with the cover removed.
Figures 2, 3:
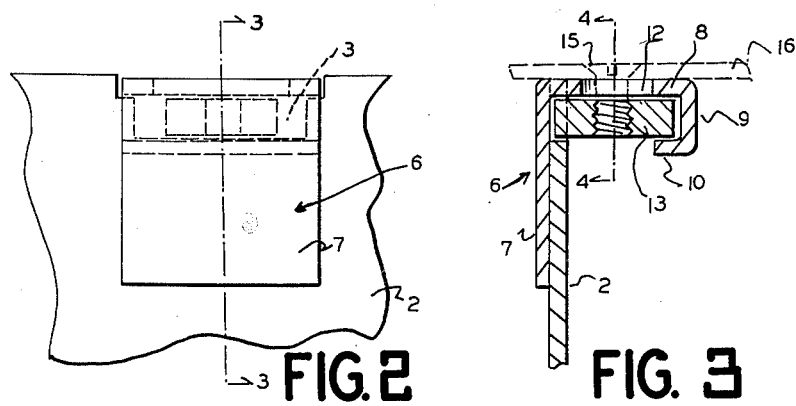
Figure 2 is a fragmentary view as seen looking from the left side of Figure 1.
Figure 3 is a section taken on the line 3—3 of Figure 2.
Figure 4:
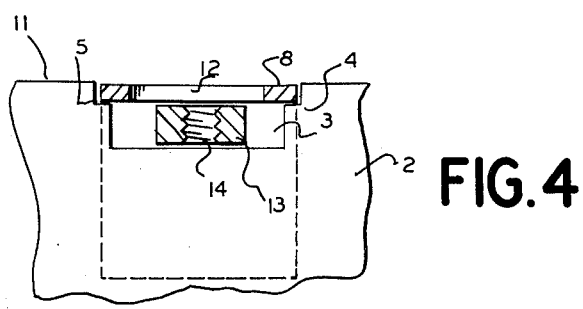
Figure 4 is a section taken on the line 4—4 of Figure 3.

In the construction shown in the drawings, the box 1 may be of any general shape or size made of metal, plastic composition or other type of materials. The box in Figure 1 is shown as rectangular and is provided at opposite ends with the means embodying the present invention. In this construction the side wall 2 of the box is recessed with a rectangular hole 3 (Figure 4), at the top edge of which are edgewise extending shoulders 4 and 5 formed outwardly from the rectangular recess 3 so that the shape of the entire recess in the wall of the box has an L-shaped form at the top on either side of the rectangular recess extending downward into the side walls. A bracket element 6 has one side plate element 7 welded in face to face contact with the side wall 2 with the top section 8 formed over at right angles providing a flange extending inwardly of the wall 2 of the box. At the inner end this flange is turned to form a channel or C-shaped section 9 with the lower portion 10 of the channel extending in a direction perpendicular to the wall 2. The bracket 6 is just wide enough so that the inwardly turned flanged section 8 rests in the shoulders 4 and 5 at the top of the box and the thickness of this flange section should be such that the top surface is flush with the top edge 11 of the box. The flange 8 at its top is provided with a slot 12 and within the bracket 6 and the wall 2 there is held a threaded nut 13 which is preferably square in shape. This nut is of such a width that it fits against the inner face 7 of the bracket 6 and the inner channel formed on the inside end of the flange 8 by the channel 9. It will be noted that since the wall 2 is recessed in the rectangular section 3 that the nut 13 cannot slide out at the sides but may be positioned within the space of the recess 3. The threaded hole 14 is directly positioned in line with the slot which extends in the flange 8 parallel with the side 2 of the box. This permits the screw 15 (Figure 3) through the box cover 16, to be threaded into the hole 14 with sufficient adjustment so that the cover can be put in the desired and correct position. The box is supplied with the nut already in position and when it is desired to put the cover on it is only necessary to center the nut so that the screw will fit into it.

Having now described my invention, I claim:

1. In combination with an electrical outlet box of the type described, means for securing a cover thereto comprising means providing a recess in the side wall of the box adjacent the surface edge on which the cover fits, a bracket having one side attached to said side wall on the outside thereof opposing said recess with a flange extending inward over the top of the recess and a downwardly turned C-shaped channel formed at the inner edge of the flange, said channel being substantially parallel to said recess, a threaded nut slidably retained between the recess and the channel, said flange having a slot therein extending parallel to the side wall of the box, the hole of said threaded nut being aligned substantially with said slot.

2. In combination with a box of the type described, means for securing a cover thereto comprising means providing a rectangular shaped recess across the side wall of the box extending from the top surface edge on which the cover fits downward, a bracket having one side attached to the outer face of the side wall covering the recess with an element at right angles thereto turned inwardly over the edge of the box at the top of the recess, said element having a top surface level with the top surface edge of the side wall, and a channel section supported by said right angle element, said channel section being opposite and parallel to said recess, a threaded nut retained between said channel and said recess and said element at right angles having a slot with which the hole in the threaded nut is aligned.

3. In combination with an electrical outlet box of the type described, means for securing a cover thereto comprising means providing a recess in the side wall of the box adjacent the surface edge on which the cover fits, a bracket having one side attached to said side wall on the outside thereof opposing said recess with a flange extending inward over the top of the recess and a downwardly turned C-shaped channel formed at the inner edge of the flange, said channel being substantially parallel to said recess, a threaded nut slidably retained between the recess and the channel, said nut having a width such that it fits between the inside surface of the bracket and the inner face of the channel, said flange having a slot therein extending parallel to the side wall of the box, the hole of said threaded nut being aligned substantially with said slot.

4. In combination with a box of the type described, means for securing a cover thereto comprising means providing a rectangular shaped recess across the side wall of the box extending from the top surface edge on which the cover fits downward, means covering the recess on the outside of the side wall, means secured to said box forming a channel spaced from the inside of the side wall opposite said recess, a nut of a size to slidably fit in the channel between the wall of the channel and the means covering the recess whereby the edges of the recess at the ends act to retain the nut from slipping out from between the channel and the side wall of the box, said nut being exposed to receive a screw for attaching a cover.

5. In combination with an electrical outlet box of the type described, means for securing a cover thereto comprising means providing an elongated recess parallel to a side edge with a shoulder facing outward at the edge of the recess, a bracket comprising a member covering the recess on the outside of the box and having an inwardly extending flange resting in said shoulder and terminating in a downwardly extending channel, the lower side of which is directed towards the side of the box parallel to the inside edge of the recess, a nut resting on one side on the lower side of the channel and on the other side on the inside edge of the recess whereby the nut is slidably retained in the channel, and a slot opposite the hole in the nut to receive a screw for holding the cover.

CARL A. P. JOHNSON.

References Cited in the file of this patent

UNITED STATES PATENTS

| Number | Name | Date |
| --- | --- | --- |
| 1,443,681 | Goodwin | Jan. 30, 1923 |
| 1,860,833 | Clayton | May 31, 1932 |
| 2,214,968 | MacMillen | Sept. 17, 1940 |
| 2,231,909 | Hempel | Feb. 18, 1941 |